US012671244B2

(12) United States Patent     (10) Patent No.:   US 12,671,244 B2

Martinez et al.       (45) Date of Patent:     Jun. 30, 2026

(54) OVERCURRENT PROTECTION BASED ON SLOPE DETECTION

(71) Applicant: Littelfuse, Inc., Chicago, IL (US)

(72) Inventors: Cesar Martinez, San Sebastian (ES); Boris Golubovic, San Francisco, CA (US); Michael Gambuzza, Boston, MA (US); Guillermo Zatorre, San Sebastian (ES)

(73) Assignee: Littelfuse, Inc., Rosemont, IL (US)

( * ) Notice: Subject to any disclaimer, the term of this patent is extended or adjusted under 35 U.S.C. 154(b) by 196 days.

(21) Appl. No.: 18/644,373

(22) Filed: Apr. 24, 2024

(65) Prior Publication Data

US 2024/0364100 A1     Oct. 31, 2024

Related U.S. Application Data

(60) Provisional application No. 63/462,780, filed on Apr. 28, 2023.

(51) Int. Cl.
    H02H 7/18       (2006.01)
    H02H 1/00       (2006.01)

(52) U.S. Cl.
    CPC ............ H02H 7/18 (2013.01); H02H 1/0007 (2013.01)

(58) Field of Classification Search
    CPC ........ H02H 7/18; H02H 1/0007; H02H 3/445; H02H 3/087; H02H 3/08; H02H 7/205; B60L 58/10; B60L 58/15; B60L 3/0069; B60L 3/0046; B60L 2270/20; B60Y 2200/91
    USPC ...................................... 361/93.1
    See application file for complete search history.

(56) References Cited

U.S. PATENT DOCUMENTS

| | | | | |
|---|---|---|---|---|
| 5,181,155 A | * | 1/1993 | Beg ........................... | H02H 3/08 |
| | | | | 361/87 |
| 7,872,447 B2 | * | 1/2011 | Morita .................... | H02J 9/061 |
| | | | | 307/49 |
| 8,730,627 B2 | * | 5/2014 | Babb ........................ | H02H 3/24 |
| | | | | 361/56 |

(Continued)

FOREIGN PATENT DOCUMENTS

| | | |
|---|---|---|
| CN | 114844175 A | 8/2022 |
| CN | 114928147 A | 8/2022 |

(Continued)

OTHER PUBLICATIONS

Extended European Search Report for related European Application No. 24171924.4, dated Oct. 30, 2024, 7 pages.

*Primary Examiner* — Dharti H Patel

(74) *Attorney, Agent, or Firm* — KDW Firm PLLC

(57) ABSTRACT

Disclosed is a control circuit, for use in a solid state battery disconnect and protection system, wherein control circuit includes a high-voltage switch coupled between an electric battery and a DC link capacitor of an electric vehicle, wherein the electric vehicle is powered by the electric battery, and a control block. The control block may by operable to monitor a rate of change and a value of a current on a connection to the high-voltage switch, determine whether the rate of change of the current exceeds a first predetermined threshold and determine whether the value of the current exceeds a second predetermined threshold, and determine an overcurrent fault exists in the case that the first or second predetermined threshold is exceeded.

14 Claims, 2 Drawing Sheets

(56) References Cited

U.S. PATENT DOCUMENTS

| | | | |
|---|---|---|---|
| 10,256,024 B1* | 4/2019 | Rogers | H02J 1/04 |
| 11,722,130 B1* | 8/2023 | Tran | H03K 17/165 |
| | | | 361/93.1 |
| 2011/0141644 A1* | 6/2011 | Hastings | H02H 1/0015 |
| | | | 361/93.2 |
| 2011/0309809 A1* | 12/2011 | Rao | H02H 9/001 |
| | | | 323/282 |
| 2012/0139514 A1* | 6/2012 | Paatero | H02M 3/156 |
| | | | 323/282 |
| 2012/0235661 A1* | 9/2012 | Roessler | H02H 3/087 |
| | | | 323/284 |
| 2013/0050880 A1* | 2/2013 | Rozman | H02H 3/025 |
| | | | 361/18 |
| 2015/0084404 A1* | 3/2015 | Hashim | B60L 15/08 |
| | | | 307/131 |
| 2015/0251542 A1* | 9/2015 | Mensah-Brown | B60L 50/40 |
| | | | 307/10.1 |
| 2015/0256070 A1* | 9/2015 | Lee | H02P 27/08 |
| | | | 323/283 |
| 2017/0305274 A1* | 10/2017 | Saha | H02H 7/1227 |
| 2017/0331400 A1* | 11/2017 | Saha | H02P 29/00 |
| 2020/0039375 A1* | 2/2020 | Ammanamanchi Venkata | |
| | | | H02J 7/02 |
| 2020/0266637 A1 | 8/2020 | Hinterberger | |
| 2021/0184456 A1* | 6/2021 | Suzuki | B60L 3/00 |
| 2022/0006285 A1* | 1/2022 | Dukaric | H02H 7/085 |
| 2022/0131398 A1* | 4/2022 | Herranz | B60L 53/22 |
| 2022/0278524 A1 | 9/2022 | Scaramucci | |
| 2023/0286388 A1* | 9/2023 | Prasad | B60L 58/15 |
| 2024/0131950 A1* | 4/2024 | Gambuzza | B60L 3/04 |
| 2024/0223070 A1* | 7/2024 | Nakagawa | H02M 1/36 |
| 2024/0339990 A1* | 10/2024 | Namuduri | H03K 3/017 |

FOREIGN PATENT DOCUMENTS

| | | | |
|---|---|---|---|
| CN | 115149558 A | 10/2022 | |
| DE | 102018207247 A1 * | 6/2019 | H02H 3/087 |
| JP | 2008067489 A | 3/2008 | |
| JP | 2012065459 A | 3/2012 | |
| JP | 2018042431 A | 3/2018 | |
| TW | 202027364 A | 7/2020 | |

* cited by examiner

OVERCURRENT PROTECTION BASED ON SLOPE DETECTION

CROSS-REFERENCE TO RELATED APPLICATION

This application claims priority to U.S. Provisional Patent Application No. 63/462,780, filed Apr. 28, 2023, entitled "Pre-Charge Short Circuit Protection," which is incorporated by reference herein in its entirety.

FIELD OF THE DISCLOSURE

Embodiments of the present disclosure relate to solid state battery disconnect and protection circuits, including overcurrent protection based on slope detection.

BACKGROUND

Electrical circuits that protect rechargeable elements, such as rechargeable EV batteries, are well known. However, such rechargeable elements can be dangerous if the operating voltage exceeds a safe limit. Overcurrent protection devices are designed to withstand a maximum current allowed, before the current rise is interrupted. The higher the current, the more difficult the design. Current approaches for overcurrent detection are based on level detection, i.e., the current must reach a certain value before the device detects the overcurrent and acts to interrupt the current rise. Therefore, the maximum current can grow potentially high before the device completes the sequence of actions to mitigate the current.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

In one approach, a control circuit for use in a solid state battery disconnect and protection system may include a high-voltage switch coupled between an electric battery and a DC link capacitor of an electric vehicle, wherein the electric vehicle is powered by the electric battery, and a control block. The control block may by operable to monitor a rate of change and a value of a current on a current path, determine whether the rate of change of the current exceeds a first predetermined threshold and determine whether the value of the current exceeds a second predetermined threshold, and determine an overcurrent fault exists in the case that the first or second predetermined threshold is exceeded.

In another approach, a control circuit for use in a solid state battery disconnect and protection system may include a high-voltage switch coupled between an electric battery and a DC link capacitor of an electric vehicle, wherein the electric vehicle is powered by the electric battery. The control circuit may further include a control block operable to monitor a rate of change and a value of a current on a connection to a switch, determine whether the rate of increase of the current exceeds a first predetermined threshold and determine whether the value of the current exceeds a second predetermined threshold, and determine an overcurrent fault exists in the case that the first or second predetermined threshold is exceeded.

In yet another approach, a control circuit for use in a solid state battery disconnect and protection system may include a high-voltage switch coupled between an electric battery and a DC link capacitor of an electric vehicle, wherein the electric vehicle is powered by the electric battery, and a control block. The control block may be operable to monitor a rate of change on a connection to the high-voltage switch, monitor a value of a current on the connection to the high-voltage switch, determine whether the rate of change of the current on the connection exceeds a first predetermined threshold and determine whether the value of the current on the connection exceeds a second predetermined threshold, determine an overcurrent fault exists in the case that the first or second predetermined threshold is exceeded, and open the high-voltage switch when the overcurrent fault is determined.

BRIEF DESCRIPTION OF THE DRAWINGS

The accompanying drawings illustrate exemplary approaches of the disclosed embodiments so far devised for the practical application of the principles thereof, and in which.

Figure 1:
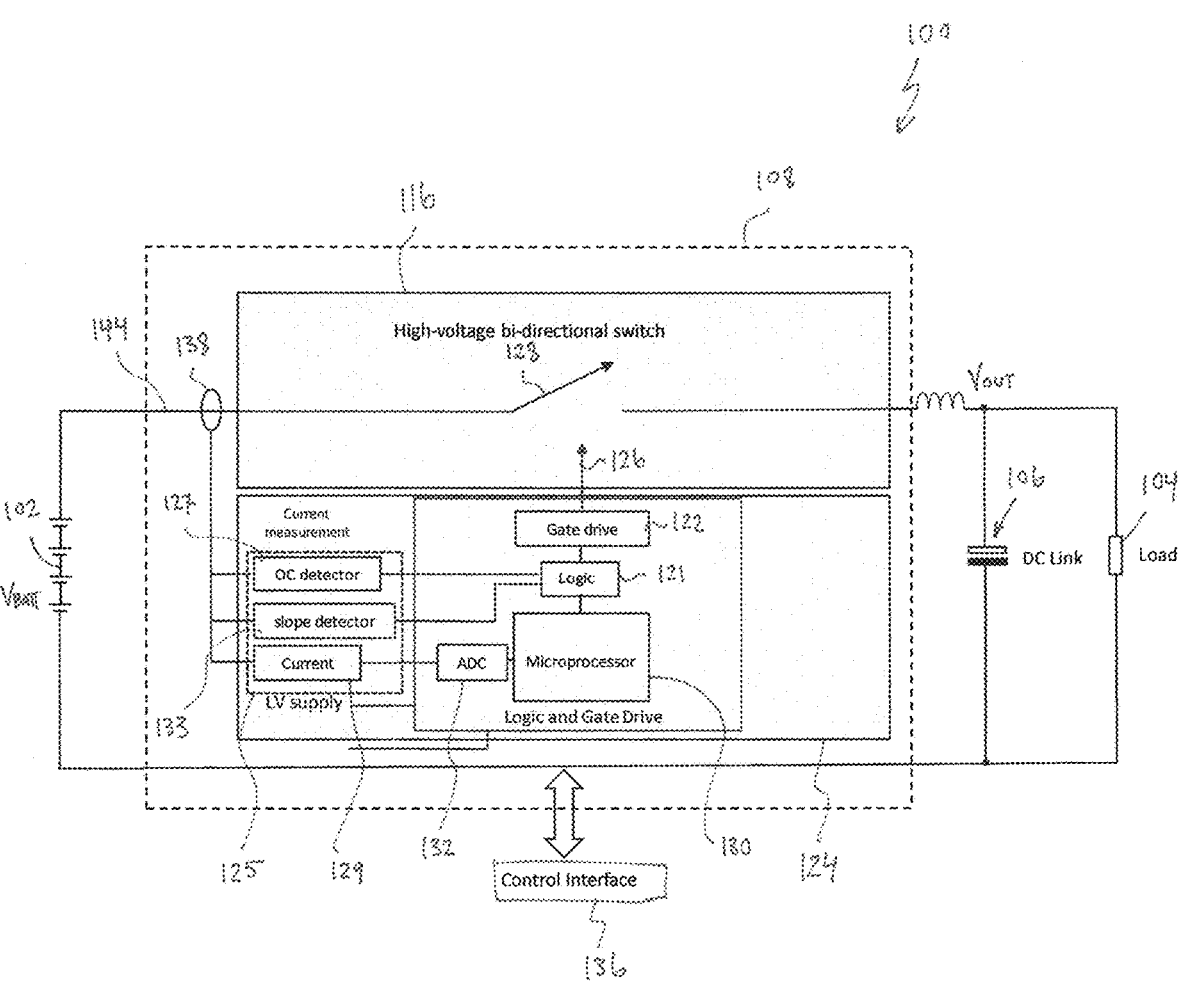
FIG. 1 is a diagram illustrating a control circuit for use in an electric vehicle system, in accordance with exemplary embodiments.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

DETAILED DESCRIPTION

The present disclosure will now proceed with reference to the accompanying drawings, in which various approaches are shown. It will be appreciated, however, that the re-usable snap-in fitting may be embodied in many different forms and should not be construed as limited to the approaches set forth herein. Rather, these approaches are provided so that this disclosure will be thorough and complete, and will fully convey the scope of the disclosure to those skilled in the art.

Embodiments herein are directed to methods for early detection of overcurrent events based on excessive current slope (di/dt). Excessive current fslope is often present since the beginning of the event, and therefore allows for faster detection of a subsequent fault.

As stated above, state-of-the-art overcurrent detection is based on level detection, whereby the actual current level is compared to a defined threshold. When this threshold is exceeded, an overcurrent "flag" is generated, and the device goes through a sequence of actions until the current rise is interrupted. However, there is a certain delay, $t_{delay}$, between the time when the current level exceeds the threshold and the time when the current rise is interrupted. More specifically, $t_{delay}$ is defined by time to flag the overcurrent (sensor'+ communication), time to compute and communicate to the gate driver, time for the gate driver to act on the control voltage of the semiconductor, and time of the semiconductor to interrupt the current rise. During this time, short-circuit current will continue to rise with a certain slope, di/dt, defined by the vehicle battery voltage and the system inductance, composed by the battery inductance and interconnect inductance until the short location, $di/dt = V_{batt}/L$. If the peak current achieved $I_{peak} = V_{batt}/L * t_{delay}$ exceeds the absolute maximum current for the semiconductor device, it may suffer permanent damage.

A way to reduce $t_{delay}$ is to use a slope (di/dt) detector to detect slope which exceeds a threshold, and generate a "slope flag". The slope detector can be implemented using analog circuitry or an ADC and a digital function to compute di/dt. Analog implementation may offer the fastest response, as no microprocessor is required. In some embodiments, a combination of slope and level detection can be used for more robust response avoiding false triggering. In some embodiments, the slope threshold can be factory programmed. Alternatively, the slope threshold can be automatically calculated in normal operation, i.e., during precharge mode if PWM modulation is used.

FIG. 1 is a representative drawing of an adaptive control circuit 108 for providing current slope detection in a solid state battery disconnect and protection system 100, according to exemplary embodiments. The solid state battery disconnect and protection system 100 consists of an electric vehicle (EV) battery 102, a load 104, and a DC link capacitor 106, with the adaptive control circuit 108 disposed between the EV battery 102 and the load 104. Principally, the load 104 is an EV motor of an electric vehicle, but the load also includes other powered components within the electric vehicle, such as air conditioning compressors, window enabling motors, and so on. Each subunit in the vehicle may have an input capacity, with the individual capacitors and number of subunits being unknown. The sum of individual capacitors is the DC link capacity ($C_{DC}$), symbolized by the DC link capacitor 106.

The adaptive control circuit 108 may be a solid state battery disconnect and protection circuit featuring a high-voltage bi-directional switch circuit 116, or high-voltage switch 116 for short, and a control block 124. Solid state battery disconnect and protection circuits use a microprocessor or microcontroller coupled with a current sensor to sample a waveform and detect any overcurrent scenarios. Solid state battery disconnect and protection circuits have a very fast response time relative to traditional circuit breakers. The high-voltage switch 116 of the adaptive control circuit 108 turns on (closes) or off (opens) to control (enable or prevent) current flow between the EV battery 102 and the load 104. In one non-limiting embodiment, the control block 124 issues a PWM signal 126 to the high-voltage switch 116, causing a switch 128 therein to turn on and off at a ratio based on the duty cycle of the PWM signal. The on/off rate or number of switching events per time is defined by the PWM switching frequency. The duty cycle defines the ratio between on-time and the switching period.

A voltage, $V_{batt}$, of the EV battery 102 and a voltage, $V_{out}$, of the DC link capacitor 106 are shown. In exemplary embodiments, the adaptive control circuit 108 may be designed to enable slow charging of the DC link capacitor 106 until its voltage is close to the voltage of the EV battery 102. Once a predefined difference, $V_{diff}$, between $V_{out}$ and $V_{batt}$ is reached, the high-voltage switch 116 will turn on (close), allowing current to flow freely between the EV battery 102 and the load 104. In this way, the EV battery 102 is able to safely power the load. Stated mathematically, once $V_{batt} - V_{out} \leq V_{diff}$, then the switch will remain closed until the electric vehicle is turned off.

The control block 124 may further include a microprocessor 130 and one or more analog-to-digital converters (ADCs) 132. In other embodiments, the control block 124 may be an equivalent integrated circuit. The ADC 132 is operable to measure the battery voltage, $V_{batt}$, and the output voltage, $V_{out}$. Before a computation can be made, the microprocessor 130 is presented with a measurement or a digital representation of the battery voltage, $V_{batt}$, and the output voltage, $V_{out}$. The ADC 132 measures and converts the voltages to digital values. The ADC 132 may also measure current 129. The microprocessor 130 can then read these results and compute the voltage difference, $V_{diff}$. Further, the microprocessor 132 generates the PWM pattern to turn the switch 128 on and off.

The control block 124 may further feature a current measurement circuit 125 including an overcurrent (OC) detector 127 and a slope detector 133. In exemplary embodiments, a logic 121 and a gate drive 122 of the adaptive control circuit 108 causes issuance of the PWM signal 126 to the high-voltage switch 116. The PWM signal 126 will enable the high-voltage switch 128 to be turned on or off, thus enabling or preventing current flow between the EV battery 102 and the DC link capacitor 106. The logic 121 and the gate drive 122 of the control block 124 may be connected to a control interface 136, which may be a wired or a wireless connection.

In exemplary embodiments, the OC detector 127 of the current measurement circuit 125 may include a Hall-effect sensor that has a pre-defined threshold such that, when the current reaches the threshold, a logic signal will be issued to the logic 121 and the gate drive 122. As an alternative to using Hall sensors, the OC detector 127 may alternatively, or additionally, use shunt resistances to sense an overcurrent, in some embodiments. It will be appreciated, that virtually any current sensor type may be used in alternative embodiments.

In some embodiments, the adaptive control circuit 108 may also include a current limiting function, wherein circle 138 denotes the wire/connection/path 144 being measured. The magnetic flux generated by the flowing current is converted to a voltage via the Hall effect. The voltage is compared to a reference in the sensor that represents the threshold voltage indicating an overcurrent. When an overcurrent occurs, a single logic signal is generated and sent to the logic 121 and the gate drive 122. In exemplary embodiments, this happens within a microsecond timeframe.

If the current exceeds a certain limit, the current limiting function is triggered and the adaptive control circuit 108 disconnects the battery and load (and stops charging). Without the current limiting function, the current would rise unbounded, stressing or damaging components and interconnects.

In exemplary embodiments, the switch 128 of the high-voltage switch 116 may be a solid state switching device, such as an insulated gate bipolar junction transistor (IGBT), a semiconductor such as a power metal-oxide semiconductor field-effect transistor (MOSFET), a thyristor, a silicon-controlled rectifier (SCR), a triode for alternating current (TRIAC), or any other suitable high-power controlled solid state device. The switch 128 connects or disconnects the EV battery 102 to the vehicle's high-voltage on-board systems. In exemplary embodiments, the switch 128 is bi-directional to allow the EV battery 102 to supply the vehicle (load 104) and to allow a charger to supply the battery. In some embodiments, the switch 128 may be controlled by a PWM signal coming from the control block 124.

The slope detector 133 of the current measurement circuit 125 may be used for early detection of overcurrent events based on excessive current slope (di/dt). Said another way, a rate of increase of the current may be flagged before a minimum overcurrent threshold level is achieved. Because excessive slope is often present from the beginning of an event, earlier recognition of the excessive slope leads to faster detection of a fault. The slope detector 133 can be implemented using analog circuitry or ADC 132 and a digital function to compute di/dt in various embodiments.

Consider the following non-limiting example for determining current slope (di/dt=$V_{batt}$/L). $V_{Batt}$=1 kV and L=1 uH. It follows that di/dt=1 kA/us. It is typical to set the current threshold above the operating current (i.e. 1 kA threshold for 500 A operating current), to avoid false triggering caused by noise. Setting a threshold of 1 kA, and $t_{delay}$=1.2 us+0.2 us+0.5 us+0.3 us=2.2 us. Imax=1 kA+2.2 us×1 kA/us=3.2 kA. Having a di/dt detector which flags excessive di/dt in 1 us, Imax=(1 us+0.2 us+0.5 us+0.3 us)×1 kA/us=2 kA. In one way, having a system application with a certain $V_{batt}$/L requirement, results in approximately 60% reduced requirement in absolute maximum current for semiconductor, which leads to a greater cost optimization. Furthermore, having a fixed semiconductor device rated at a certain absolute maximum current, it can be used in a system with higher battery voltage and/or smaller inductance.

Figure 2:
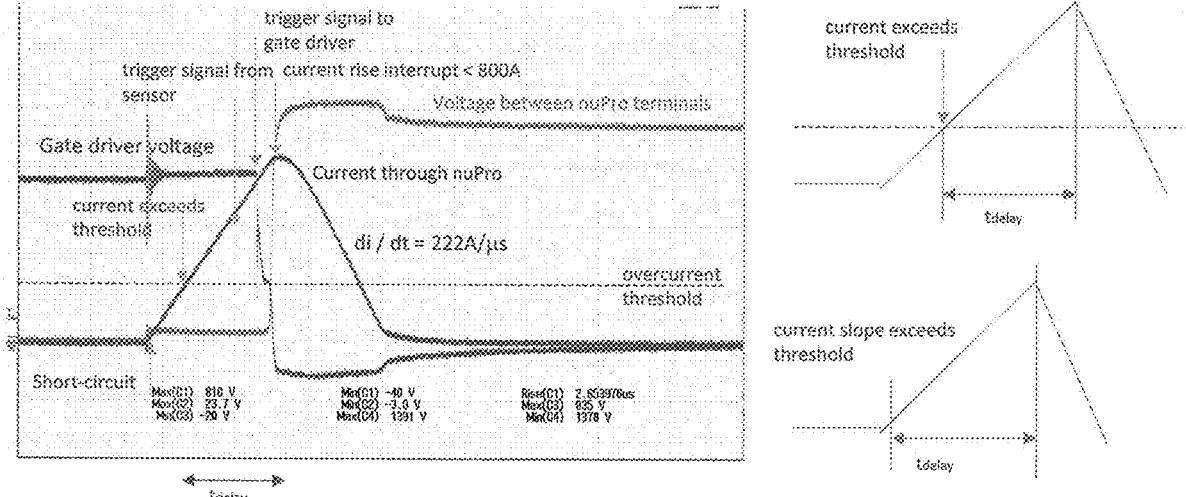
FIG. 2 is a diagram illustrating the operating principle of the control circuit of FIG. 1, according to exemplary embodiments.

FIG. 2 demonstrates the level threshold vs. slope detector, and is representative of the operating principle of the adaptive control circuit 108 of FIG. 1. Here, the current measurement circuit is operable to monitor a rate of change of the current and a value of the current. The current is monitored to determine whether the rate of change of the current exceeds a first predetermined threshold and to determine whether the value of the current exceeds a second predetermined threshold. The second predetermined threshold may be a specific current value. As shown, an overcurrent fault may exist in the case that the first or second predetermined threshold is exceeded. That is, if di/dt exceeds a specific value, the device may begin a sequence of actions until the current rise is interrupted. It should be noted that the first predetermined threshold may be triggered before the second predetermined threshold is triggered. However, in other cases in which the current increases gradually, the first predetermined threshold may not be tripped.

In some embodiments, the overcurrent protection circuit is resettable. That is, when the circuit protection is tripped, the system may try again after a certain time to verify if the overcurrent condition remains, or if it was caused by a noise of some other transient effect. Upon reconnection, a similar method (e.g. di/dt) can be used as criteria to determine if the overcurrent event remains.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A control circuit for use in a solid-state battery disconnect and protection system, the control circuit comprising:
   a high-voltage switch coupled between an electric battery and a DC link capacitor of an electric vehicle, wherein the electric vehicle is powered by the electric battery; and
   a control block operable to:
   monitor a rate of change and a value of a current on a current path;
   determine whether the rate of change of the current exceeds a first predetermined threshold and determine whether the value of the current exceeds a second predetermined threshold; and
   determine an overcurrent fault exists in the case that the first or second predetermined threshold is exceeded, wherein the first predetermined threshold is exceeded before the second predetermined threshold.

2. The control circuit of claim 1, wherein the control block is further operable to open the high-voltage switch when the overcurrent fault is determined.

3. The control circuit of claim 1, wherein the control block is further operable to reset the high-voltage switch following the overcurrent fault.

4. The control circuit of claim 1, wherein the control block further comprises a current measurement circuit, and wherein the current measurement circuit comprises an overcurrent detector operable to determine the value of the current and a slope detector operable to determine the rate of change of the current.

5. The control circuit of claim 1, wherein the rate of change comprises a rate of increase.

6. A control circuit for use in a solid-state battery disconnect and protection system, the control circuit comprising:
   a high-voltage switch coupled between an electric battery and a DC link capacitor of an electric vehicle, wherein the electric vehicle is powered by the electric battery; and
   a control block operable to:
   monitor a rate of increase and a value of a current on a connection to the high-voltage switch;

determine whether the rate of increase of the current exceeds a first predetermined threshold and determine whether the value of the current exceeds a second predetermined threshold; and determine an overcurrent fault exists in the case that the first or second predetermined threshold is exceeded, wherein the first predetermined threshold is exceeded before the second predetermined threshold.

7. The control circuit of claim 6, wherein the control block is further operable to open the high-voltage switch when the overcurrent fault is determined.

8. The control circuit of claim 6, wherein the control block is further operable to reset the high-voltage switch following the overcurrent fault.

9. The control circuit of claim 6, wherein the control block further comprises a current measurement circuit, and wherein the current measurement circuit comprises an overcurrent detector operable to determine the value of the current and a slope detector operable to determine the rate of increase of the current.

10. The control cicuit of claim 9, wherein the control block further comprises logic and a gate drive operable to open the high-voltage switch when the overcurrent fault is determined.

11. A control circuit for use in a solid-state battery disconnect and protection system, the control circuit comprising:

a high-voltage switch coupled between an electric battery and a DC link capacitor of an electric vehicle, wherein the electric vehicle is powered by the electric battery; and a control block operable to:

monitor a rate of change on a connection to the high-voltage switch;

monitor a value of a current on the connection to the high-voltage switch;

determine whether the rate of change of the current on the connection exceeds a first predetermined threshold and determine whether the value of the current on the connection exceeds a second predetermined threshold;

determine an overcurrent fault exists in the case that the first or second predetermined threshold is exceeded, wherein the first predetermined threshold is exceeded before the second predetermined threshold; and open the high-voltage switch when the overcurrent fault is determined.

12. The control circuit of claim 11, wherein the control block is further operable to reset the high-voltage switch following the overcurrent fault.

13. The control circuit of claim 11, wherein the control block further comprises a current measurement circuit, and wherein the current measurement circuit comprises:

an overcurrent detector operable to determine the value of the current; and a slope detector operable to determine the rate of change of the current.

14. The control cicuit of claim 13, wherein the control block further comprises logic and a gate drive operable to open the high-voltage switch when the overcurrent fault is determined.

\* \* \* \* \*